(12) United States Patent
Koyanagi et al.

(10) Patent No.: US 10,264,151 B2
(45) Date of Patent: Apr. 16, 2019

(54) INFORMATION PROCESSING DEVICE, IMAGE PROCESSING SYSTEM AND NON-TRANSITORY COMPUTER READABLE MEDIUM STORING PROGRAM

(71) Applicant: FUJI XEROX CO., LTD., Tokyo (JP)

(72) Inventors: Katsuya Koyanagi, Yokohama (JP); Kazuhiro Oya, Yokohama (JP); Kunihiko Kobayashi, Yokohama (JP); Shigeru Okada, Yokohama (JP); Shintaro Adachi, Yokohama (JP); Hiroyuki Kishimoto, Yokohama (JP); Akane Yoshizaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 151 days.

(21) Appl. No.: 15/132,923

(22) Filed: Apr. 19, 2016

(65) Prior Publication Data

US 2017/0142274 A1 May 18, 2017

(30) Foreign Application Priority Data

Nov. 16, 2015 (JP) .................................. 2015-224319

(51) Int. Cl.
*G06F 15/00* (2006.01)
*H04N 1/00* (2006.01)
*G06K 9/00* (2006.01)
*G06K 9/18* (2006.01)

(52) U.S. Cl.
CPC ..... *H04N 1/00801* (2013.01); *G06K 9/00456* (2013.01); *G06K 9/00483* (2013.01); *G06K 9/18* (2013.01); *G06K 2209/01* (2013.01)

(58) Field of Classification Search
CPC .......... H04N 1/00801; G06K 9/00456; G06K 9/00483; G06K 9/18
USPC ......................................................... 358/403
See application file for complete search history.

(56) References Cited

U.S. PATENT DOCUMENTS

| | | | |
|---|---|---|---|
| 7,194,471 B1* | 3/2007 | Nagatsuka | G06F 17/3071 |
| 7,254,270 B2* | 8/2007 | Simske | G06K 9/00456 |
| | | | 345/619 |
| 8,086,045 B2* | 12/2011 | Kobayashi | G06K 9/00442 |
| | | | 358/403 |
| 2002/0016825 A1* | 2/2002 | Uchida | G06F 17/30707 |
| | | | 709/207 |
| 2005/0271352 A1* | 12/2005 | Yokouchi | G11B 27/329 |
| | | | 386/224 |

FOREIGN PATENT DOCUMENTS

| | | |
|---|---|---|
| JP | H09-6865 A | 1/1997 |
| JP | 2006-185176 A | 7/2006 |
| JP | 2008-129792 A | 6/2008 |

* cited by examiner

*Primary Examiner* — Mark R Milia
(74) *Attorney, Agent, or Firm* — Oliff PLC

(57) ABSTRACT

An information processing device includes: an obtaining unit that obtains a first classification condition for classifying a document by use of image information of an image formed on the document; an acceptance unit that accepts a second classification condition for classifying the document, the second classification condition being defined by a user; and a classification unit that applies the first classification condition and the second classification condition to the image information based on a predetermined rule of a degree of priority, and classifies the document.

6 Claims, 11 Drawing Sheets

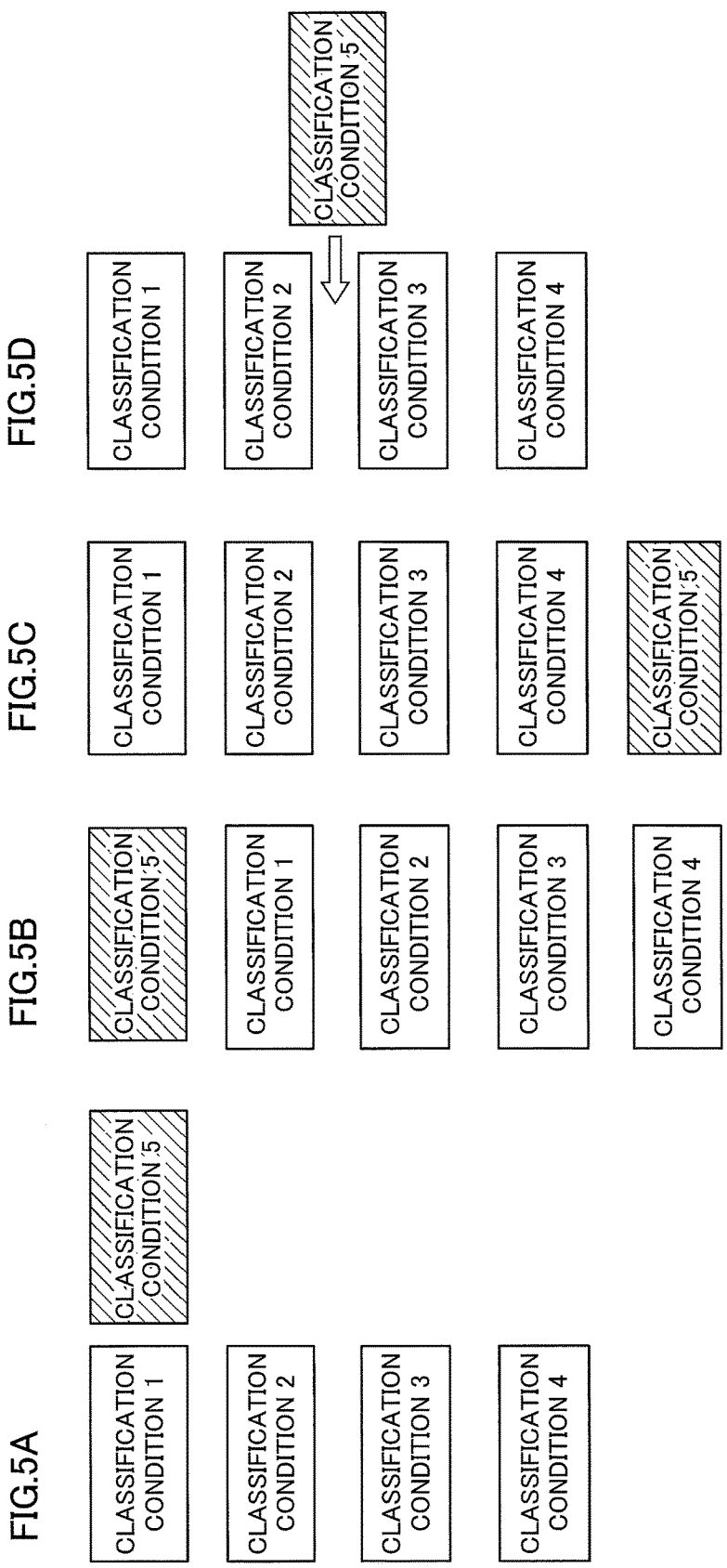

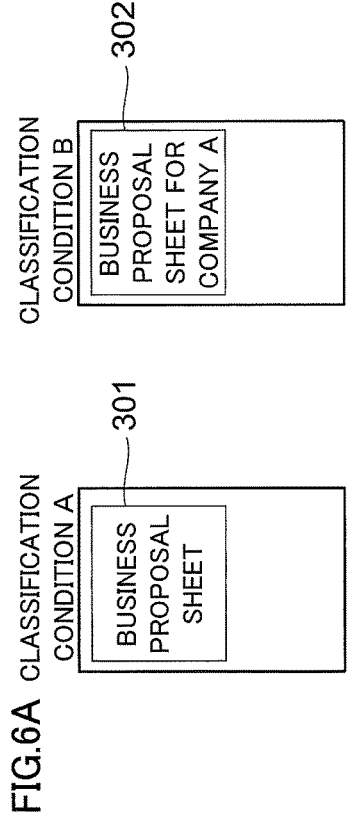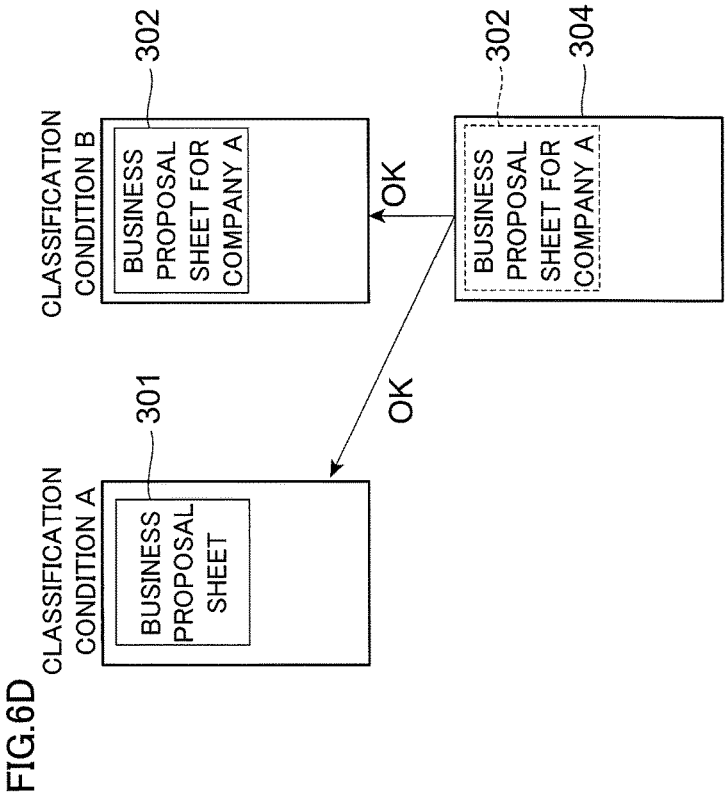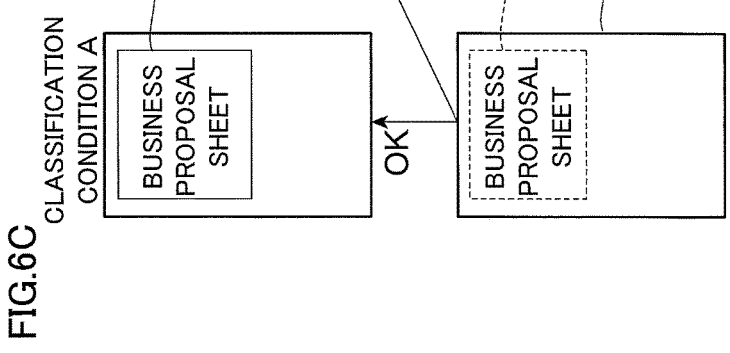

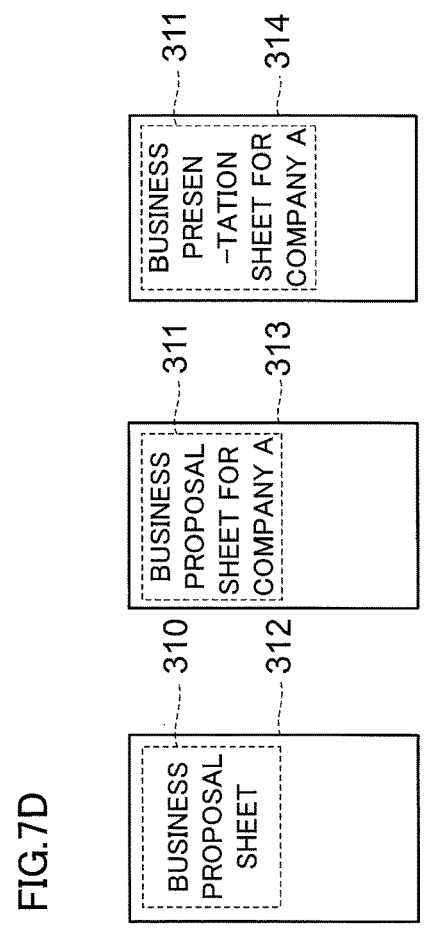
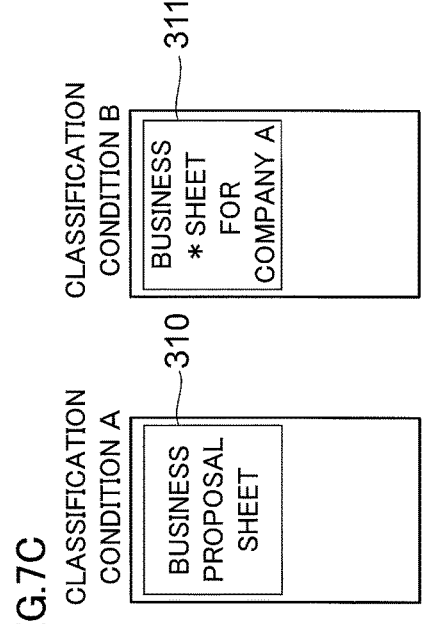
FIG.7A
FIG.7B
FIG.7C
FIG.7D

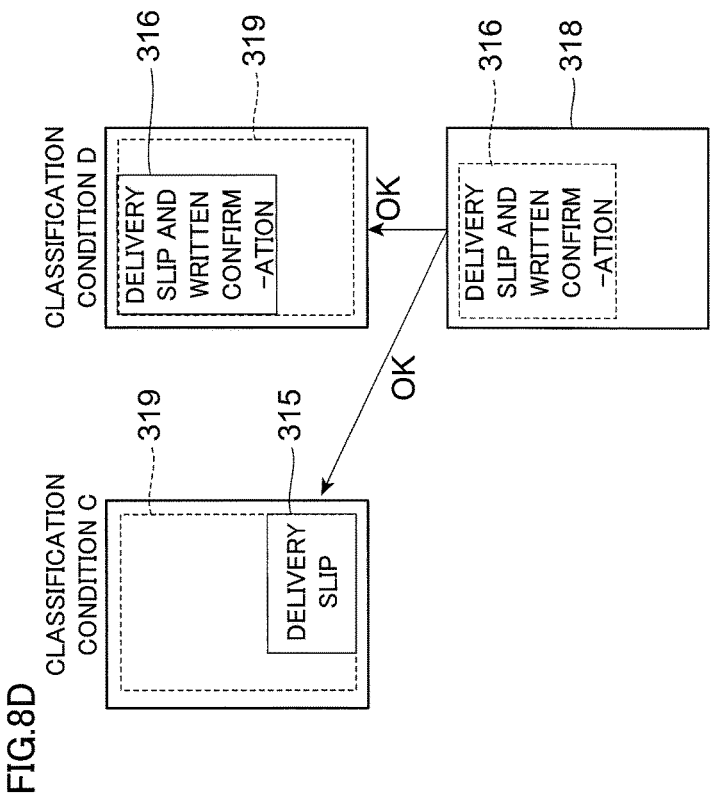
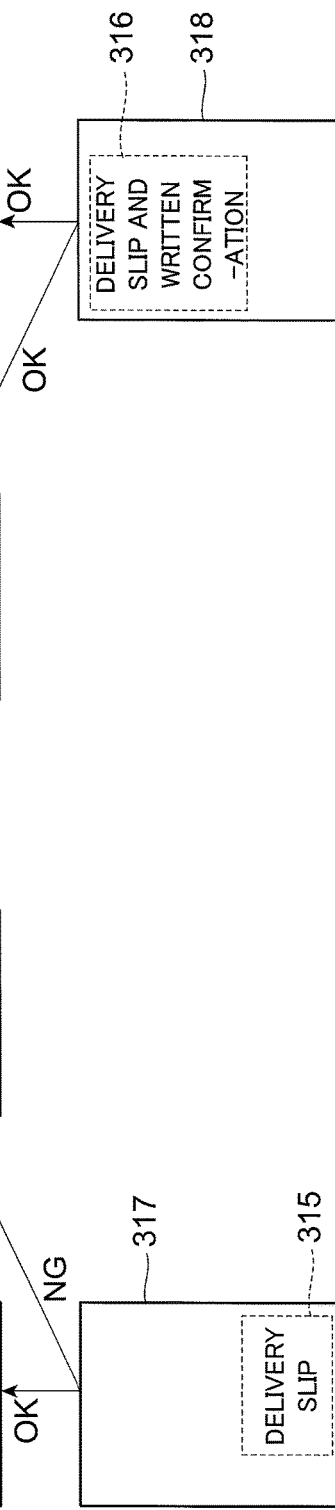
FIG.8A CLASSIFICATION CONDITION C
FIG.8B
FIG.8C CLASSIFICATION CONDITION C
FIG.8D CLASSIFICATION CONDITION C

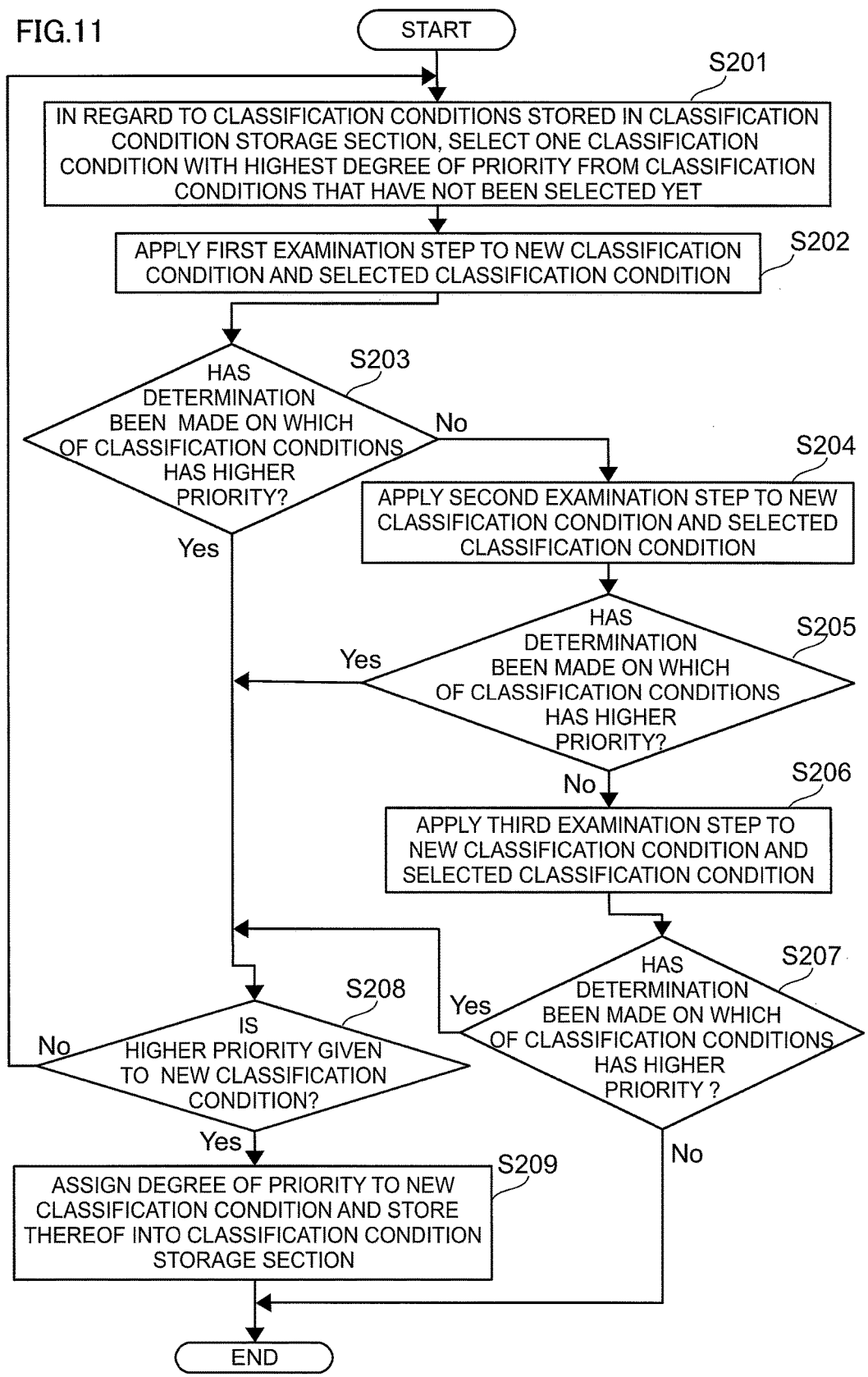

INFORMATION PROCESSING DEVICE, IMAGE PROCESSING SYSTEM AND NON-TRANSITORY COMPUTER READABLE MEDIUM STORING PROGRAM

CROSS REFERENCE TO RELATED APPLICATION

This application is based on and claims priority under 35 USC § 119 from Japanese Patent Application No. 2015-224319 filed Nov. 16, 2015.

BACKGROUND

Technical Field

The present invention relates to an information processing device, an image processing system and a non-transitory computer readable medium storing a program.

Related Art

In recent years, a lot of techniques for classifying documents based on information of images formed on the documents by use of the OCR function have been suggested.

SUMMARY

According to an aspect of the present invention, there is provided an information processing device including: an obtaining unit that obtains a first classification condition for classifying a document by use of image information of an image formed on the document; an acceptance unit that accepts a second classification condition for classifying the document, the second classification condition being defined by a user; and a classification unit that applies the first classification condition and the second classification condition to the image information based on a predetermined rule of a degree of priority, and classifies the document.

BRIEF DESCRIPTION OF THE DRAWINGS

An exemplary embodiment of the present invention will be described in detail based on the following figures, wherein:

FIGS. 5A to 5D are diagrams for illustrating an example of a first process and a second process according to the exemplary embodiment;

FIGS. 6A to 6D are diagrams for illustrating an example of a first examination step according to the exemplary embodiment;

FIGS. 7A to 7D are diagrams for also illustrating an example of the first examination step according to the exemplary embodiment;

FIGS. 8A to 8D are diagrams for illustrating an example of a second examination step according to the exemplary embodiment;

FIG. 11 is a flowchart showing procedures of determining a degree of priority of a classification condition by the second process.

DETAILED DESCRIPTION

Hereinafter, an exemplary embodiment according to the present invention will be described in detail with reference to attached drawings.

<Overall Configuration of Image Processing System>

Figure 1:
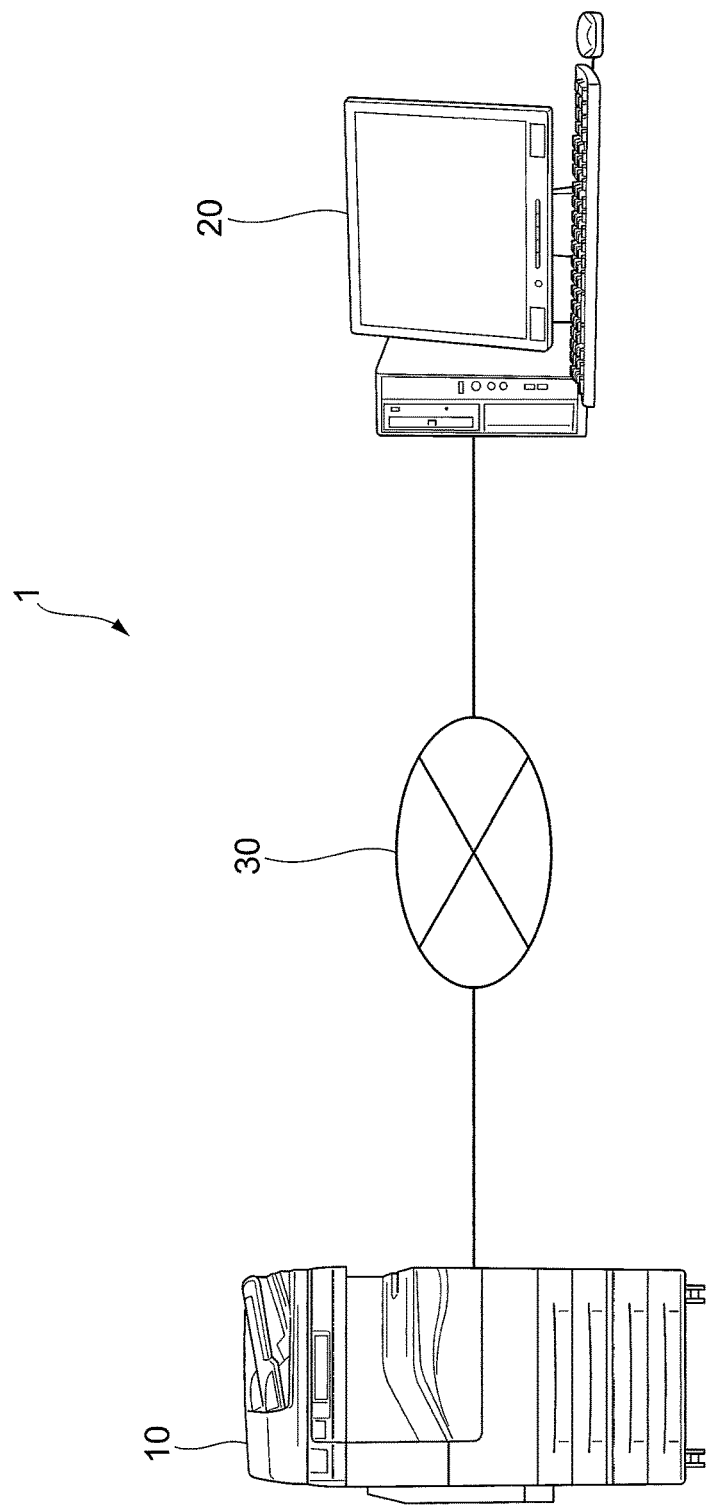
FIG. 1 is a diagram showing an overall configuration of an image processing system according to the exemplary embodiment.

First, an overall configuration of an image processing system 1 according to the exemplary embodiment will be described. FIG. 1 is a diagram showing an overall configuration of the image processing system 1 according to the exemplary embodiment. The image processing system 1 according to the exemplary embodiment is a system for classifying documents, such as forms. Specifically, in the image processing system 1, various kinds of documents, such as "delivery slip" and "business proposal sheet", are set, and classification is performed in accordance with contents of the documents. Owing to classification of documents, a use is, for example, able to confirm entries in a document or able to handle a document according to a flow determined for each category, in a classified state.

As shown in the figure, the image processing system 1 includes an image reading device 10 that reads an image formed on a document to create image data (image information) and a terminal device 20 that receives the image information from the image reading device 10 via a network 30 and classifies a document.

The image reading device 10 has a scanning function, and thereby reads an image formed on a document (sheet), such as a form, and creates image information indicating the read image. Here, the image reading device 10 is, for example, a scanner device, in which a CCD system that reduces reflected light of light emitted to a document from a light source by a lens and receives the reduced reflected light by a CCD (Charge Coupled Devices), a CIS system that receives reflected light of light sequentially emitted to a document from an LED light source by a CIS (Contact Image Sensor), or the like is employed. Note that, in addition to the scanning function, the image reading device 10 may include, for example, a printing function, a copying function, a facsimile function and the like.

The terminal device 20, as an example of an information processing device, receives the image information created by the image reading device 10 via the network 30 to apply an OCR process to the received image information. Then, the terminal device 20 recognizes characters, numerics, symbols, marks or the like included in a document (hereinafter, characters, numerics, symbols, marks or the like are simply referred to as "characters") by the OCR process, and performs classification of the document based on the recognized characters (that is, classification of an image formed on the document). As the terminal device 20, for example, computer equipment, such as a server device, may be used.

The network 30 is a communication tool used for information communication between the image reading device 10 and the terminal device 20, and is, for example, LAN (Local Area Network).

Here, in the terminal device 20, a condition for classifying a document based on image information of an image formed on the document (hereinafter, referred to as a classification condition) is determined in advance. The terminal device 20 performs classification of a document by applying the classification condition to the image information received from the image reading device 10. Specifically, in the classification condition, characters corresponding to a classification category to which the document is to be classified and a region on the document where the characters should exist are designated. The terminal device 20 performs character recognition in the region on the document designated by the classification condition (hereinafter, referred to as a designated region), and determines whether or not the characters designated by the classification condition (hereinafter, referred to as designated characters) exist within the designated region. If the designated characters exist in the designated region, the document matches the classification condition, and classified into a classification category of the classification condition.

Such classification conditions are formed by a maker or the like in advance, through no operation by a user, in some cases. Moreover, a case in which a user newly forms a classification condition or a case in which a user corrects a classification condition that has already been formed can be considered. Here, in a case where a document to be classified matches plural classification conditions, if a classification condition for classifying the document into a desired classification category is not applied as a priority, it can be considered that the document is classified into a different classification category erroneously. Therefore, though detailed description will be given later, the terminal device 20 according to the exemplary embodiment determines a degree of priority with respect to a classification condition that has already been defined and a classification condition to be newly defined, even in a case where a user newly defines the classification condition, to perform a process for classifying a document.

<Hardware Configuration of Image Reading Device>

Figure 2:
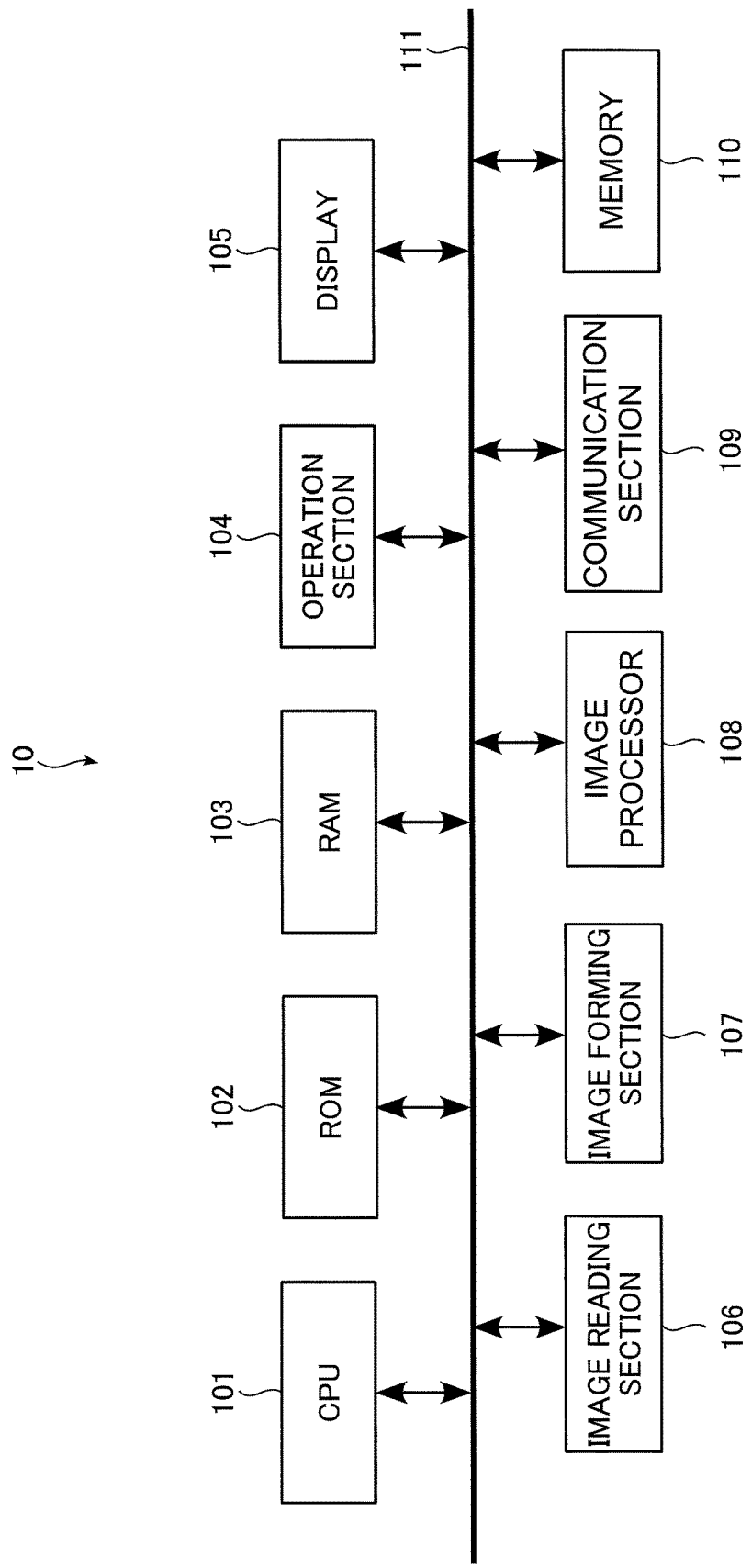
FIG. 2 is a diagram showing a hardware configuration example of an image reading device according to the exemplary embodiment.

Next, a hardware configuration of the image reading device 10 according to the exemplary embodiment will be described. FIG. 2 is a diagram showing a hardware configuration example of the image reading device 10 according to the exemplary embodiment. As shown in the figure, the image reading device 10 includes: a CPU (Central Processing Unit) 101; a ROM (Read Only Memory) 102; a RAM (Random Access Memory) 103; an operation section 104; a display 105; an image reading section 106; an image forming section 107; an image processor 108; a communication section 109; and a memory 110. Note that the respective functional sections are connected to a bus 111, and performs data transmission and reception via the bus 111.

The CPU 101 executes various kinds of programs, such as an OS (Operating System) or application. Moreover, the ROM 102 is a memory that stores a control program executed by the CPU 101. The RAM 103 is a memory used as a working memory or the like for the CPU 101. Then, the CPU 101 reads the control program stored in the ROM 102 and executes the control program using the RAM 103 as a work area. When the control program is executed by the CPU 101, each function in the image reading device 10 is implemented.

The operation section 104 accepts operations by a user. The operation section 104 is configured with, for example, hardware keys. Moreover, the operation section 104 is configured with, for example, a touch panel that outputs a control signal in response to a contact position. As a measure for detecting the contact, anything, such as a measure for detecting based on a pressure caused by the contact, or a measure for detecting based on static electricity of a contact item, may be used.

The display 105 is configured with, for example, a liquid crystal display, and displays data related to the image reading device 10. The display 105 displays, for example, a screen referenced by a user when the user operates the image reading device 10.

The image reading section 106, as an example of an image reading unit, reads an image formed on a document that has been set, and creates image information indicating the read image.

The image forming section 107 includes a print mechanism that forms an image on a recording medium, such as a sheet. Here, the image forming section 107 is, for example, a printer, and a printer of an electrophotographic system that forms an image by transferring toner attached to a photoreceptor onto a recording medium or a printer of an ink jet system that forms an image by ejecting ink onto a sheet may be used.

The image processing section 108 applies image processing, such as color correction or tone correction, to an image represented by image data.

The communication section 109 is connected to a not-shown communication line and functions as a communication interface that performs transmission and reception of various kinds of data with other devices connected to the communication line. For example, via the communication section 109, transmission and reception of image data with other devices are performed.

The memory 110 includes a storage region, such as a hard disk device, and stores, for example, data received by the communication section 109 or data created by the image reading device 10.

<Hardware Configuration of Terminal Device>

Figure 3:
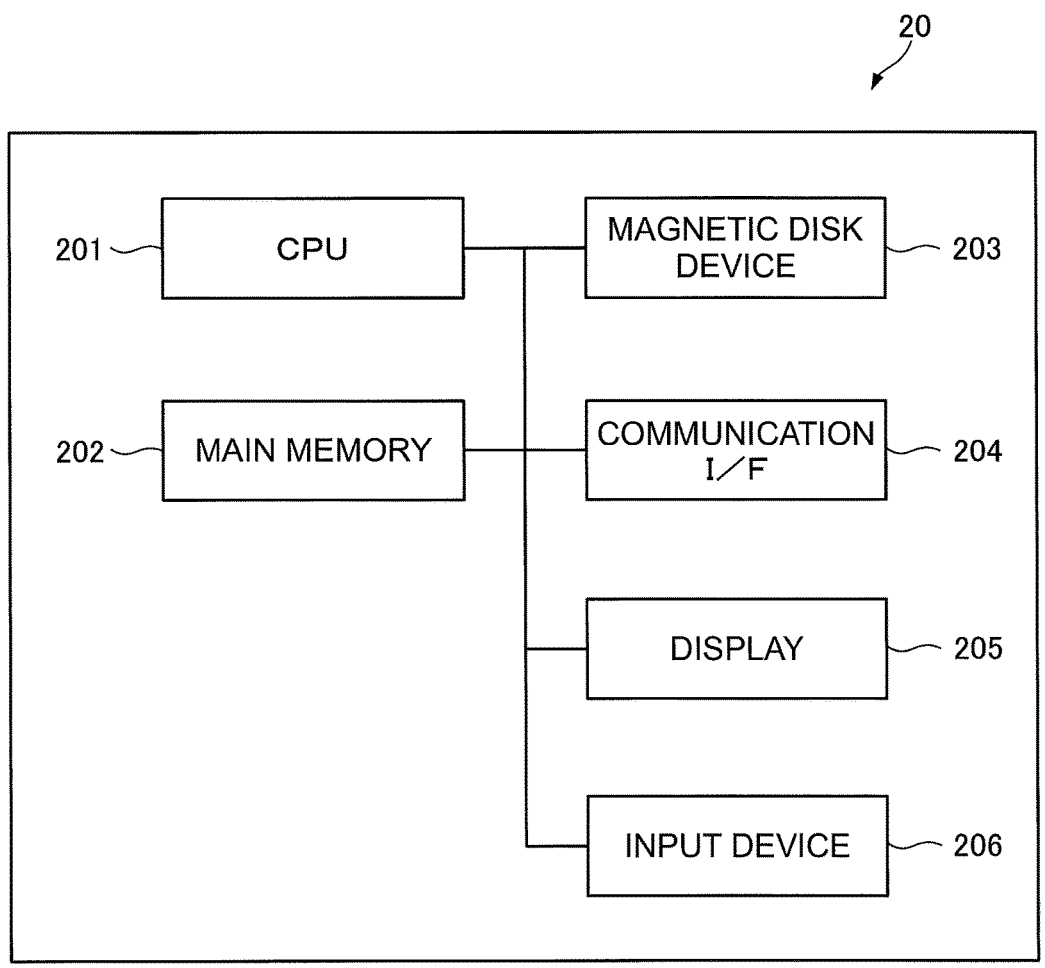
FIG. 3 is a diagram showing a hardware configuration example of a terminal device according to the exemplary embodiment.

Next, a hardware configuration of the terminal device 20 according to the exemplary embodiment will be described. FIG. 3 is a diagram showing a hardware configuration example of the terminal device 20 according to the exemplary embodiment.

As shown in the figure, the terminal device 20 includes: a CPU 201, which is a computing measure; a main memory 202, which is a storing measure; and a magnetic disk device (HDD: Hard Disk Drive) 203. Here, the CPU 201 executes various kinds of programs, such as an OS or applications, to thereby implement each function of the terminal device 20. Moreover, the main memory 202 is a storage region for storing various kinds of programs or data used for executing the programs. The magnetic disk device 203 is a storage region for storing data inputted to various kinds of programs or data outputted from various kinds of programs.

Further, the terminal device 20 includes: a communication interface (hereinafter, referred to as "communication I/F") 204 for performing communication with outside; a display 205 configured with a video memory, a display or the like; and an input device 206, such as a touch panel, a keyboard or a mouse.

<Functional Configuration of Terminal Device>

Figure 4:
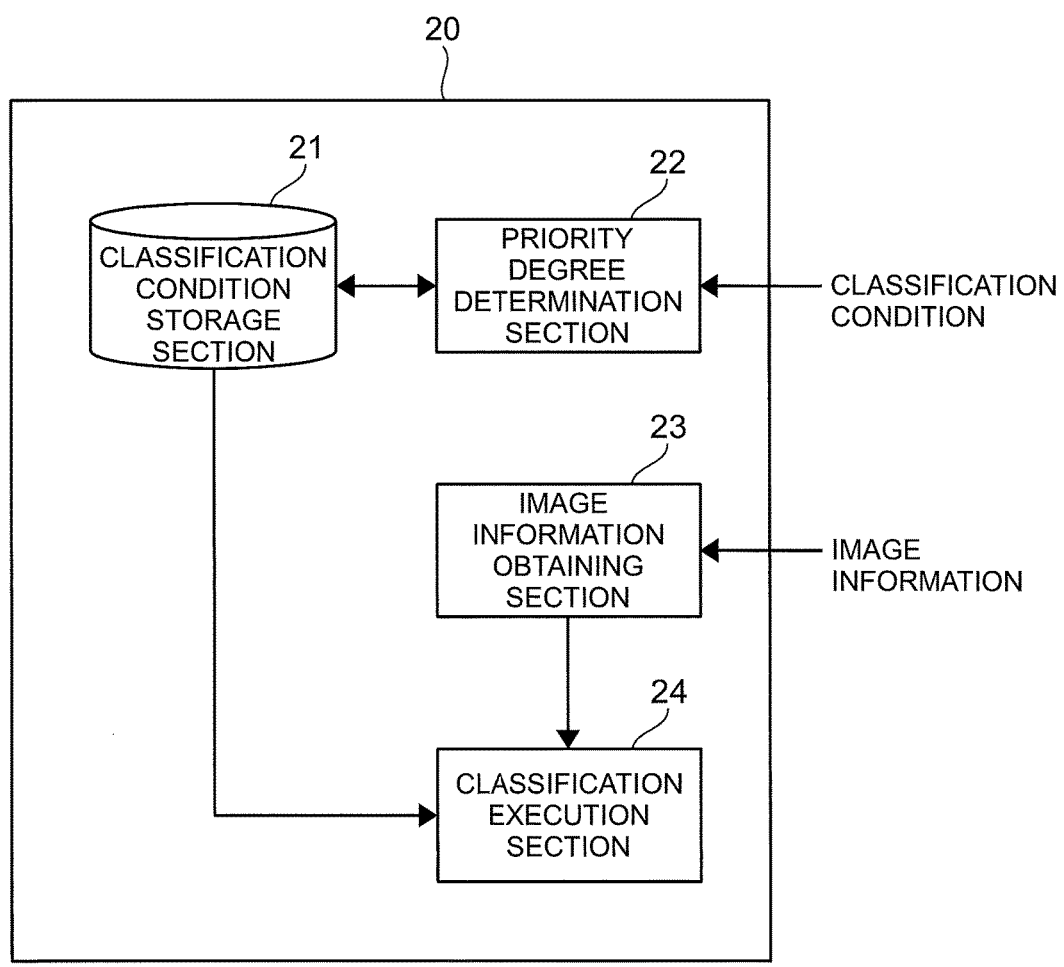
FIG. 4 is a block diagram showing a functional configuration example of a terminal device according to the exemplary embodiment.

Next, a functional configuration of the terminal device 20 according to the exemplary embodiment will be described. FIG. 4 is a block diagram showing a functional configuration example of the terminal device 20 according to the exemplary embodiment.

The terminal device 20 includes: a classification condition storage section 21 that stores classification conditions for classifying documents; a priority degree determination section 22 that determines a degree of priority of the classification conditions; an image information obtaining section 23 that obtains image information from the image reading device 10; and a classification execution section 24 that applies a classification condition to the image information obtained from the image reading device 10, to thereby perform classification of a document.

The classification condition storage section 21 stores various kinds of classification conditions determined for classifying the documents. Some of the stored classification conditions have been prepared in advance by manufacturers or the like, and others are prepared or corrected by users. Moreover, each of the classification conditions is provided with a degree of priority. For example, the classification condition having been prepared in advance by the manufacturer or the like is also provided with a degree of priority by the manufacturer or the like. Moreover, for example, the classification condition defined by a user is provided with a degree of priority by the process of the priority degree determination section 22.

The priority degree determination section 22 determines a degree of priority of a classification condition. Specifically, upon accepting a new classification condition newly defined due to preparation or correction by a user, the priority degree determination section 22 obtains a classification condition stored in the classification condition storage section 21. Then, the priority degree determination section 22 compares the new classification condition with the classification condition obtained from the classification condition storage section 21, to thereby determine a degree of priority of the new classification condition. Here, the priority degree determination section 22 executes a first process or a second process to determine the degree of priority of the new classification condition.

To additionally describe, in the exemplary embodiment, the classification condition stored in the classification condition storage section 21 is used as an example of a first classification condition. Moreover, the new classification condition newly defined by the user is used as an example of a second classification condition. Further, the first process and the second process are used as an example of a predetermined rule of a degree of priority.

The first process determines a degree of priority based on preliminary settings. Here, which of the new classification condition and the classification condition stored in the classification condition storage section 21 has priority is set in advance. For example, if setting in which the priority is given to the new classification condition is made, the priority degree determination section 22 sets the degree of priority of the new classification condition higher than the degree of priority of the classification condition stored in the classification condition storage section 21.

The second process determines a degree of priority based on the contents defined in each classification condition, in other words, information of the designated region and the designated characters defined in each classification condition. Specifically, the priority degree determination section 22 selects one of the classification conditions stored in the classification condition storage section 21, and then applies three examination steps to the selected classification condition and the new classification condition. By application of the three examination steps, which of the two classification conditions is provided with priority is determined. Details of the three examination steps will be described later.

Note that the new classification condition defined by the user is assumed to be provided with information about priority determined by the first process or the second process and stored into the classification condition storage section 21.

Moreover, in the exemplary embodiment, for example, the first process is executed when the preliminary setting for executing the first process has been made, whereas the second process is executed when the preliminary setting has not been made. It is assumed that, for example, the preliminary setting has been made in advance by the manufacturers or the like in some cases, and the preliminary setting is made by a user in other cases.

The image information obtaining section 23 obtains image information created by reading an image on a document from the image reading device 10.

The classification execution section 24 performs classification of a document by applying the classification condition stored in the classification condition storage section 21 to the image information obtained by the image information obtaining section 23. Here, since the classification condition is provided with a degree of priority, the classification execution section 24 applies the classification conditions to the image information in descending order of degree of priority. Then, if the image information matches the classification condition, the classification execution section 24 classifies the document corresponding to the image information into a classification category determined by the matching classification condition. The classification result of the document is displayed, for example, on the display 205 to be shown to the user.

Note that each functional section constituting the terminal device 20 shown in FIG. 4 is implemented by cooperation of software and hardware resources. Specifically, the CPU 201 reads the programs for implementing the priority degree determination section 22, the image information obtaining section 23, the classification execution section 24 and the like, for example, from the magnetic disk device 203 into the main memory 202 and executes thereof, and accordingly, these functional sections are implemented. Moreover, the classification condition storage section 21 is implemented by, for example, the magnetic disk device 203.

Moreover, in the exemplary embodiment, the priority degree determination section 22 has a function as an example of an obtaining unit, an acceptance unit and a creation unit. In addition, the classification execution section 24 has a function as an example of a classification unit.

<Description of First Process and Second Process>

Here, with reference to FIGS. 5A to 5D, the first process and the second process will be described in detail. FIGS. 5A to 5D are diagrams for illustrating an example of the first process and the second process according to the exemplary embodiment. As shown in FIG. 5A, here, four classification conditions (classification conditions 1 to 4) are stored in the classification condition storage section 21, and one classification condition (classification condition 5) is newly added. The classification conditions 1 to 4 have high priority degree in descending order.

First, if the preliminary setting for executing the first process has been made, the first process is executed. Here, if setting in which the priority is given to the new classification condition is made, the degree of priority of the classification condition 5 is higher than the degree of priority of the classification conditions 1 to 4. Therefore, as shown in FIG. 5B, the classification condition 5 is added above the classification condition 1. On the other hand, if setting in which the priority is given to the classification conditions stored in the classification condition storage section 21 is made, the degree of priority of the classification condition 5 is lower than the degree of priority of the classification conditions 1 to 4. Therefore, as shown in FIG. 5C, the classification condition 5 is added below the classification condition 4.

Moreover, if the preliminary setting has not been made, the second process is executed. Here, from the classification conditions stored in the classification condition storage section 21, the priority degree determination section 22 selects the one with the highest priority (in the specific example shown in FIG. 5D, the classification condition 1). Then, the three examination steps are applied to the selected classification condition (the classification condition 1) and the new classification condition (the classification condition 5). As a result, if the degree of priority of the classification condition 5 is higher, the priority degree determination section 22 adds the classification condition 5 above the classification condition 1. On the other hand, if the degree of priority of the classification condition 1 is higher, the priority degree determination section 22 selects the one with the highest priority next to the classification condition 1 (in this example, the classification condition 2) from the classification conditions stored in the classification condition storage section 21. Then, the three examination steps are applied again to the selected classification condition (the classification condition 2) and the new classification condition (the classification condition 5).

In this manner, in the second process, the priority degree determination section 22 selects the classification conditions in descending order of the degree of priority from those stored in the classification condition storage section 21, and compares the selected classified condition with the new classified condition. In the specific example shown in FIG. 5D, the classification condition 5 is determined to have the degree of priority lower than that of the classified condition 2 and higher than that of the classified condition 3, and accordingly, added between the classified condition 2 and the classified condition 3.

<Description of Three Examination Steps>

Next, the three examination steps executed in the second process will be described by taking a specific example. In the three examination steps, the classified condition defined by the user and the classified condition selected from the classification condition storage section 21 are compared. Moreover, the three examination steps are executed in the order of the first examination step, the second examination step and the third examination step.

Figure 9:
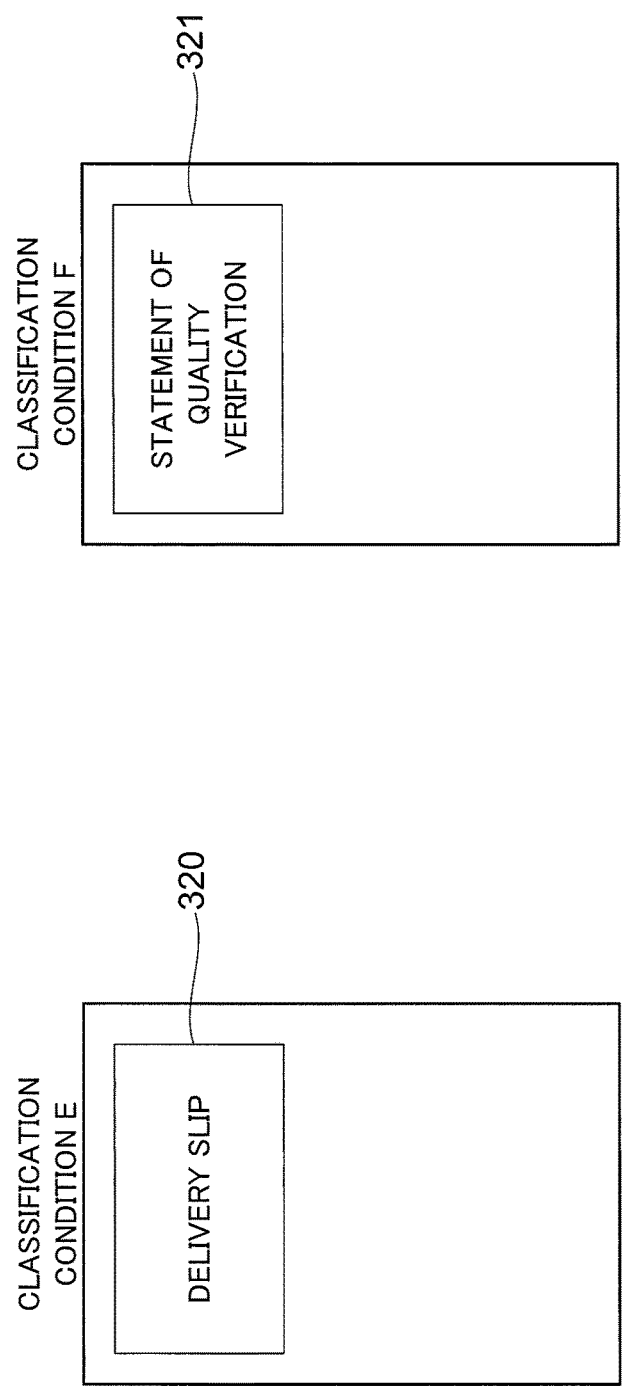
FIG. 9 is a diagram for illustrating an example of a third examination step according to the exemplary embodiment.

FIGS. 6A to 6D and 7A to 7D are diagrams for illustrating an example of the first examination step according to the exemplary embodiment. FIGS. 8A to 8D are diagrams for illustrating an example of the second examination step according to the exemplary embodiment. FIG. 9 is a diagram for illustrating an example of the third examination step according to the exemplary embodiment.

(First Examination Step)

First, with reference to FIGS. 6A to 6D, the first examination step will be described. As shown in FIG. 6A, as two classification conditions subjected to determination of the degree of priority, a classification condition A and a classification condition B are provided. In the classification condition A, a designated region 301 is defined and the designated characters "business proposal sheet" is also defined. In other words, if the character string "business proposal sheet" exists within the designated region 301 in the document, the document matches the classification condition A, and is classified into, for example, the business proposal sheet. Moreover, in the classification condition B, a designated region 302 is defined and the designated characters "business proposal sheet for company A" is also defined. That is, if the character string "business proposal sheet for company A" exists within the designated region 302 in the document, the document matches the classification condition B, and is classified into, for example, the business proposal sheet for company A.

Moreover, in the specific example shown in the figure, it is assumed that the position and the size of the designated region 301 are in common with the position and the size of the designated region 302.

Here, in the first examination step, to evaluate the two classification conditions, the priority degree determination section 22 creates document data that matches each of the classification conditions (hereinafter, referred to as evaluation document data). In the specific example shown in FIG. 6B, evaluation document data 303 matching the classification condition A and evaluation document data 304 matching the classification condition B are provided. In other words, the evaluation document data 303 is created to include the designated characters "business proposal sheet" in the designated region 301 in the document. The evaluation document data 304 is created to include the designated characters "business proposal sheet for company A" in the designated region 302 in the document. Here, the designated characters "business proposal sheet" of the evaluation document data 303 may exist anywhere as long as they are within the designated region 301. In the specific example shown in the figure, the designated characters "business proposal sheet" are positioned at the center of the designated region 301. In a similar way, the designated characters "business proposal sheet for company A" of the evaluation document data 304 may exist anywhere as long as they are within the designated region 302. In the specific example shown in the figure, the designated characters "business proposal sheet for company A" are positioned at the center of the designated region 302.

Moreover, in the exemplary embodiment, as an example of first image information and second image information, the evaluation document data is used. To additionally describe, in the specific example shown in FIG. 6B, if the classification condition A is stored in the classification condition storage section 21, the classification condition A can be grasped as an example of the first classification condition, and the evaluation document data 303 can be grasped as an example of the first image information. Moreover, if the classification condition B is a new classification condition newly defined by a user, the classification condition B can be grasped as an example of the second classification condition, and the evaluation document data 304 can be grasped as an example of the second image information.

Next, FIG. 6C shows a case in which both of the classification condition A and the classification condition B are applied to the evaluation document data 303. In the evaluation document data 303, the characters "business proposal sheet" exist, whereas the characters "business proposal sheet for company A" do not exist. Therefore, the evaluation document data 303 matches the classification condition A (OK), but does not match the classification condition B (NG).

Moreover, FIG. 6D shows a case in which both of the classification condition A and the classification condition B are applied to the evaluation document data 304. Within the designated region 302 in the evaluation document data 304, the characters "business proposal sheet for company A" exist. Here, since the position and the size of the designated region 301 is in common with the position and the size of the designated region 302, the characters "business proposal sheet" exist within the designated region 301 in the evaluation document data 304. As a result, the evaluation document data 304 matches the classification condition B (OK), and also matches the classification condition A (OK).

In this manner, the evaluation document data 303 that matches the classification condition A does not match the classification condition B; however, the evaluation document data 304 that matches the classification condition B also matches the classification condition A. From such a result, it can be said that the range of the classification condition B is narrower than the range of the classification condition A, and the classification condition B is included in the classification condition A. In such a case, in the first examination step, the priority is given to the classification condition B. In other words, the classification condition B is treated to have higher priority than the classification condition A.

Moreover, a case can be considered, in which the regular expression is used for the designated characters defined by the classification condition. The regular expression is a method of representing a set of character string by a single form. With reference to FIGS. 7A to 7D, description will be given of the case in which the regular expression is used for the designated characters. As shown in FIG. 7A, in the classification condition A, a designated region 305 is defined and the designated characters "business proposal sheet" is also defined. Moreover, in the classification condition B, a designated region 306 is defined and the designated characters "business*sheet" is also defined. The character string "business*sheet" is a regular expression indicating that the characters "proposal" in "business proposal sheet" can be replaced with any characters. Specifically, "business proposal sheet", "business presentation sheet" and the like are applicable.

Moreover, in the specific example shown in the figure, it is assumed that the position and the size of the designated region 305 are in common with the position and the size of the designated region 306.

In this case, as shown in FIG. 7B, as evaluation document data 307 satisfying the classification condition A, data including the designated characters "business proposal sheet" in the designated region 305 is created. Moreover, the regular expression is used for the designated characters in the classification condition B, and plural pieces of evaluation document data are created. Specifically, as evaluation document data 308 satisfying the classification condition B, data including the designated characters "business proposal sheet" in the designated region 306 is created. Moreover, as evaluation document data 309 satisfying the classification condition B, data including the designated characters "business presentation sheet" in the designated region 306 is created.

Note that the pieces of evaluation document data satisfying the classification condition B may be three or more, and the character string included within the designated region 306 is not limited to "business proposal sheet" or "business presentation sheet". For example, in a case where a document to be classified by the classification condition B is concretely assumed, the priority degree determination section 22 may create the evaluation document data by using a character string designated by a user as the character string of the regular expression.

Here, the evaluation document data 307 that matches the classification condition A also matches the classification condition B. Moreover, the evaluation document data 308 that matches the classification condition B also matches the classification condition A. On the other hand, the evaluation document data 309 that matches the classification condition B does not match the classification condition A. From such a result, it can be said that the range of the classification condition A is narrower than the range of the classification condition B, and the classification condition A is included in the classification condition B. Therefore, the priority is given to the classification condition A, and the classification condition A is treated to have higher priority than the classification condition B.

Moreover, in the specific example shown in FIG. 7C, in the classification condition A, a designated region 310 is defined and the designated characters "business proposal sheet" is also defined. Moreover, in the classification condition B, a designated region 311 is defined and the designated characters, which is a regular expression, "business*sheet for company A" is also defined. In this case, as shown in FIG. 7D, as evaluation document data 312 satisfying the classification condition A, data including the designated characters "business proposal sheet" in the designated region 310 is created. Moreover, as evaluation document data 313 that matches the classification condition B, data including the designated characters "business proposal sheet for company A" in the designated region 311 is created. Moreover, as evaluation document data 314 satisfying the classification condition B, data including the designated characters "business presentation sheet for company A" in the designated region 311 is created.

Note that the pieces of evaluation document data matching the classification condition B may be three or more, and the character string included within the designated region 311 is not limited to "business proposal sheet for company A" or "business presentation sheet for company A". Moreover, in the specific example shown in the figure, it is assumed that the position and the size of the designated region 310 are in common with the position and the size of the designated region 311.

Here, the evaluation document data 312 that matches the classification condition A does not match the classification condition B. Moreover, the evaluation document data 313 that matches the classification condition B also matches the classification condition A. On the other hand, the evaluation document data 314 that matches the classification condition B does not match the classification condition A. In such a case, an inclusion relation between the classification condition A and the classification condition B is not defined, and in the first examination step, which of the classification condition A and the classification condition B is provided with priority is not determined.

In this way, in the first examination step, the priority degree determination section 22 creates pieces of evaluation document data corresponding to the respective two classification conditions, and actually applies the created evaluation document data to both of the two classification conditions. Then, based on the inclusion relation between the two classification conditions, the degree of priority is determined.

(Second Examination Step)

Next, with reference to FIGS. 8A to 8D, the second examination step will be described. As shown in FIG. 8A, as the two classification conditions subjected to determination of the degree of priority, a classification condition C and a classification condition D are provided. To additionally describe, if the degree of priority is not determined with respect to the classification condition C and the classification condition D even though the first examination step is executed, the second examination step is executed. In the classification condition C, a designated region 315 is defined and the designated characters "delivery slip" are also defined. In other words, if the character string "delivery slip" exists within the designated region 315 in the document, the document matches the classification condition C, and is classified into, for example, the delivery slip. Moreover, in the classification condition D, a designated region 316 is defined and the designated characters "delivery slip and written confirmation" is also defined. In other words, if the character string "delivery slip and written confirmation" exists within the designated region 316 in the document, the document matches the classification condition D, and is classified into, for example, the delivery slip and written confirmation.

Here, in the second examination step, similar to the first examination step, pieces of evaluation document data that match the respective two classification conditions are created. In the specific example shown in FIG. 8B, evaluation document data 317 matching the classification condition C and evaluation document data 318 matching the classification condition D are provided. In other words, the evaluation document data 317 is created to include the designated characters "delivery slip" in the designated region 315 in the document. The evaluation document data 318 is created to include the designated characters "delivery slip and written confirmation" in the designated region 316 in the document. Here, the designated characters "delivery slip" of the evaluation document data 317 may exist anywhere as long as they are within the designated region 315. In the specific example shown in the figure, the designated characters "delivery slip" are positioned at the center of the designated region 315. In a similar way, the designated characters "delivery slip and written confirmation" of the evaluation document data 318 may exist anywhere as long as they are within the designated region 316. In the specific example shown in the figure, the designated characters "delivery slip and written confirmation" are positioned at the center of the designated region 316.

Next, as shown in FIGS. 8C and 8D, the priority degree determination section 22 newly sets a designated region 319 which is common to the classification condition C and the classification condition D. The designated region 319 may be a region including at least the designated region 315 and the designated region 316 in the document, and, for example, may be the whole document. Then, the priority degree determination section 22 newly sets the designated region 319 in the classification condition C and the classification condition D and applies thereof to the evaluation document data 317 and the evaluation document data 318. In other words, in the classification condition C, it is determined whether or not the designated characters "delivery slip" exist within the designated region 319. Moreover, in the classification condition D, it is determined whether or not the designated characters "delivery slip and written confirmation" exist within the designated region 319.

FIG. 8C shows a case in which the evaluation document data 317 is applied to the classification condition C and the classification condition D. Here, in the evaluation document data 317, the characters "delivery slip" exist, whereas the characters "delivery slip and written confirmation" do not exist. Therefore, the evaluation document data 317 matches the classification condition C (OK), but does not match the classification condition D (NG).

Moreover, FIG. 8D shows a case in which the evaluation document data 318 is applied to the classification condition C and the classification condition D. Here, within the designated region 316 in the evaluation document data 318, the characters "delivery slip and written confirmation" exist. Therefore, in the evaluation document data 318, the characters "delivery slip" exist within the designated region 319. As a result, the evaluation document data 318 matches the classification condition D (OK), and also matches the classification condition C (OK).

In this manner, the evaluation document data 317 that matches the classification condition C does not match the classification condition D. On the other hand, the evaluation document data 318 that matches the classification condition D also matches the classification condition C. From such a result, it can be said that the range of the classification condition D is narrower than the range of the classification condition C, and the classification condition D is included in the classification condition C. In such a case, in the second examination step, the priority is given to the classification condition D. In other words, the classification condition D is treated to have higher priority than the classification condition C.

Moreover, in the case where the regular expression is used for the designated characters, similar to the first examination, the priority degree determination section 22 creates plural pieces of evaluation document data on the assumption by assuming plural sets of designated characters corresponding to the regular expression. Then, similar to the process shown in FIGS. 8A to 8D, the priority degree determination section 22 newly sets a designated region common to the two classification conditions and applies each of the evaluation document data pieces to the classification conditions, to thereby determine the degree of priority.

In this way, in the second examination step, the priority degree determination section 22 sets a new designated region including the designated regions of the respective two classification conditions. Moreover, the priority degree determination section 22 creates pieces of evaluation document data corresponding to the respective two classification conditions, and actually applies the created evaluation document data to the two classification conditions. Then, based on the inclusion relation between the two classification conditions, the degree of priority is determined.

To additionally describe, the second examination step can be grasped as a process for determining the degree of priority of the classification condition based on the inclusion relation between the designated characters defined in the two classification conditions in disregard of the designates regions of the classification conditions. Here, the priority degree determination section 22 may compare the two classification conditions without using the evaluation document data.

In the specific example shown in FIGS. 8A to 8D, the characters "delivery slip" are included in "delivery slip and written confirmation". Here, in disregard of the designated regions, it can be determined that the range of the classification condition D with the designated characters "delivery slip and written confirmation" is narrower than the region of the classification condition C with the designated characters "delivery slip" based on the inclusion relation between the designated characters. In other words, without using the evaluation document data, the classification condition D is determined to be included in the classification condition C, and thereby the priority is given to the classification condition D.

Moreover, in the case where the regular expression is used for the designated characters, for example, if designated characters of the two classification conditions are "business proposal sheet" and "business*sheet", respectively, "business proposal sheet" is applicable to one of the character strings represented by "business*sheet". In this case, it can be determined that the range of the classification condition with the designated characters "business proposal sheet" is narrower than the region of the classification condition with the designated characters "business*sheet" based on the inclusion relation between the designated characters. In other words, without using the evaluation document data, determination is made regarding the inclusion relation between the classification conditions, and the degree of priority is determined.

Note that, for example, Japanese Patent Application Laid-Open Publication No. 2006-185176 describes a process to determine whether or not a set of series described by a regular expression includes a set of series described by another regular expression. It may be possible to determine an inclusion relation between two classification conditions by the process like this to determine which classification condition is provided with priority.

(Third Examination Step)

Next, with reference to FIG. 9, the third examination step will be described. As shown in FIG. 9, as the two classification conditions subjected to determination of the degree of priority, a classification condition E and a classification condition F are provided. To additionally describe, if the degree of priority is not determined with respect to the classification condition E and the classification condition F even though the first examination step and the second examination step are executed, the third examination step is executed. In the classification condition E, a designated region 320 is defined and the designated characters "delivery slip" are also defined. In other words, if the character string "delivery slip" exists within the designated region 320 in the document, the document matches the classification condition E, and is classified into, for example, the delivery slip. Moreover, in the classification condition F, a designated region 321 is defined and the designated characters "statement of quality verification" is also defined. In other words, if the character string "statement of quality verification" exists within the designated region 321 in the document, the document matches the classification condition F, and is classified into, for example, the statement of quality verification.

Moreover, in the specific example shown in the figure, it is assumed that the sizes (areas) of the designated region 320 and the designated region 321 are equal.

Here, in the third examination step, in the two classification conditions, the number of words in the designated characters per unit area of the designated region is calculated. In other words, in regard to the classification condition E, the number of words in the designated characters "delivery slip" per unit area of the designated region 320 is calculated. Moreover, in regard to the classification condition F, the number of words in the designated characters "statement of quality verification" per unit area of the designated region 321 is calculated. In the specific example shown in the figure, the sizes of the designated region 320 and the designated region 321 are equal, and the number of words in "delivery slip" is "2", whereas the number of words in "statement of quality verification" is "4". Therefore, the number of words in the designated characters per unit area of the designated region 321 is larger than the number of words in the designated characters per unit area of the designated region 320. In such a case, in the third examination step, the priority is given to the classification condition F. In other words, the classification condition F is treated to have higher priority than the classification condition E.

Moreover, in the case where the regular expression is used for the designated characters, the number of words in the designated characters per unit area is calculated in a similar manner. For example, since the designated characters "business*sheet", which is a regular expression, includes "business proposal sheet" or "business presentation sheet", it can be said that the classification condition of the designated characters "business*sheet" should be provided with degree of priority lower than that of the classification condition having designated characters "business proposal sheet" or "business presentation sheet". Therefore, the designated characters "business*sheet" are treated as including less than 3 words, for example, "2.5 words". Further, if the character string of the regular expression can be concretely determined, the number of words in the regular expression may be determined based on the concrete character string.

In this way, in the third examination step, for each of the two classification conditions, the priority degree determination section 22 calculates the number of words in the designated characters per unit area of the designated region. Then, the classification condition having larger number of words in the designated characters per unit area is provided with priority.

<Procedures of Determining Priority Degree of Classification Condition>

Figure 10:
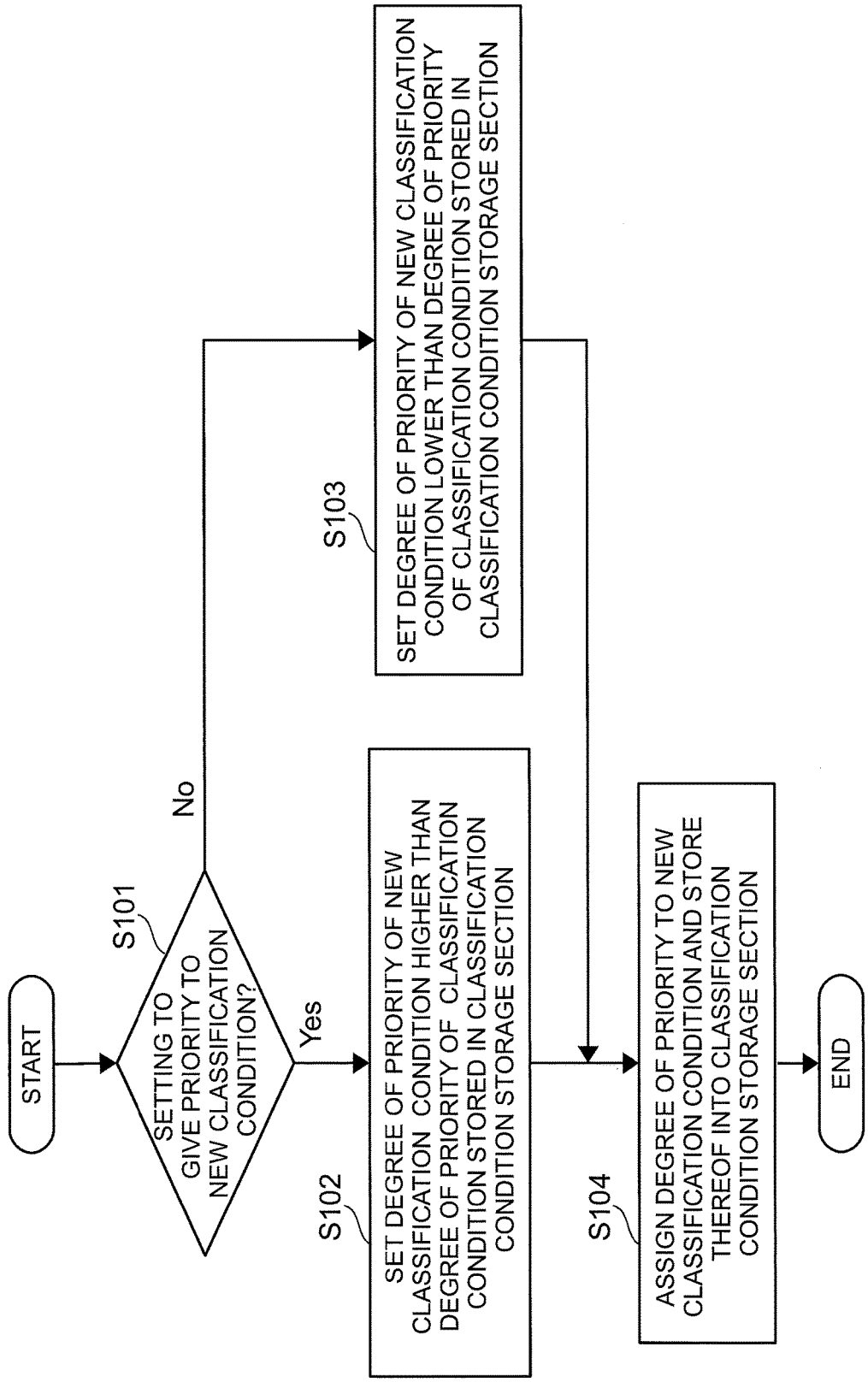
FIG. 10 is a flowchart showing procedures of determining a degree of priority of a classification condition by the first process.

Next, procedures of determining the degree of priority of the classification condition will be described. Here, procedures of determining the degree of priority by the first process and procedures of determining the degree of priority by the second process are separated and described. FIG. 10 is a flowchart showing the procedures of determining the degree of priority of the classification condition by the first process. FIG. 11 is a flowchart showing the procedures of determining the degree of priority of the classification condition by the second process. To additionally describe, in the case where a new classification condition is defined, if the preliminary settings for executing the first process have been made in the terminal device 20, the process of the procedures shown in FIG. 10 is executed. Moreover, if the preliminary settings have not been made in the terminal device 20, the process of the procedures shown in FIG. 11 is executed.

First, with reference to FIG. 10, the case in which the first process is executed will be described. The priority degree determination section 22 determines, of a new classification condition and a classification condition stored in the classification condition storage section 21, whether or not settings for giving priority to the new classification condition have been made (step 101). If positive determination (Yes) is made in step 101, the priority degree determination section 22 sets the degree of priority of the new classification condition higher than the degree of priority of the classification condition stored in the classification condition storage section 21 (step 102). In other words, the new classification condition becomes the classification condition of the highest degree of priority in the classification conditions.

Moreover, if negative determination (No) is made in step 101, the priority degree determination section 22 sets the degree of priority of the new classification condition lower than the degree of priority of the classification condition stored in the classification condition storage section 21 (step 103). In other words, the new classification condition becomes the classification condition of the lowest degree of priority in the classification conditions.

After step 102 or step 103, the priority degree determination section 22 assigns a degree of priority to the new classification condition and stores thereof into the classification condition storage section 21 (step 104). Then, the process flow is completed. Moreover, if the degree of priority of the new classification condition is determined by step 102 or step 103, for example, the priority degree determination section 22 may display the information about determined degree of priority on the display 205 or the like to show to the user.

Next, with reference to FIG. 11, the case in which the second process is executed will be described. In regard to the classification conditions stored in the classification condition storage section 21, the priority degree determination section 22 selects one classification condition with the highest degree of priority from the classification conditions that have not been selected yet (step 201). Next, the priority degree determination section 22 applies the first examination step to the new classification condition and the selected classification condition (step 202). Next, the priority degree determination section 22 determines whether or not determination on which of the two classification conditions has higher priority has been made by the first examination step (step 203).

If positive determination (Yes) is made in step 203, the process proceeds to step 208, which will be described later. On the other hand, if negative determination (No) is made in step 203, the priority degree determination section 22 applies the second examination step to the new classification condition and the selected classification condition (step 204). Next, the priority degree determination section 22 determines whether or not determination on which of the two classification conditions has higher priority has been made by the second examination step (step 205). If positive determination (Yes) is made in step 205, the process proceeds to step 208, which will be described later.

On the other hand, if negative determination (No) is made in step 205, next, the priority degree determination section 22 applies the third examination step to the new classification condition and the selected classification condition (step 206). Next, the priority degree determination section 22 determines whether or not determination on which of the two classification conditions has higher priority has been made by the third examination step (step 207). If positive determination (Yes) is made in step 207, the process proceeds to step 208, which will be described later. On the other hand, if negative determination (No) is made in step 207, the degree of priority of the new classification condition is not determined, and the process flow is completed.

If positive determination (Yes) is made in step 203, step 205 or step 207, the priority degree determination section 22 determines whether or not determination that the new classification condition has degree of priority higher than that of the selected classification condition is made (step 208). If positive determination (Yes) is made in step 208, the priority degree determination section 22 sets the new classification condition to a classification condition having a degree of priority higher than that of the selected classification condition, and assigns a degree of priority to the new classification condition, to store thereof into the classification condition storage section 21 (step 209). Then, the process flow is completed.

On the other hand, if negative determination (No) is made in step 208, the new classification condition is set to be a classification condition having a degree of priority lower than that of the selected classification condition, and the process returns to step 201. In step 201, one of the classification conditions stored in the classification condition storage section 21 is continuously selected, and comparison between the new classification condition and the selected classification condition is performed.

Moreover, if positive determination (Yes) is made in step 208 and the degree of priority of the new classification condition is determined, the priority degree determination section 22 may, for example, display the information about determined degree of priority on the display 205 or the like to show to the user. Moreover, if negative determination (No) is made in step 207 and the degree of priority of the new classification condition is not determined, the priority degree determination section 22 may, for example, display a message telling that the degree of priority has not been determined, or information of classification conditions that has become targets for comparison, etc., on the display 205 or the like to show to the user.

As described above, the terminal device 20 according to the exemplary embodiment executes the first process or the second process to determine the degree of priority of the classification condition. Moreover, in the second process, the first to third examination steps are executed to determine the degree of priority of the classification condition. Therefore, even if a classification condition is newly defined by a user, comparison with classification conditions defined in advance by a manufacturer or the like is carried out, to thereby determine the degree of priority. Then, based on the determined degrees of priority, classification of documents will be performed.

Moreover, in the exemplary embodiment, all of the three examination steps are executed; however, it may be possible to execute any one or two of the three examination steps. For example, it can be said that, if the degree of priority is determined in the first examination step, the similar result is obtained in the second examination step. Therefore, it may be possible to execute the second examination step without executing the first examination step.

Further, in the exemplary embodiment, it is assumed that the terminal device 20 compares the new classification condition and the classification condition stored in the classification condition storage section 21 in the second process; however, the terminal device 20 is not limited to such a configuration. For example, if the degree of priority has not been determined between two classification conditions stored in the classification condition storage section 21, the terminal device 20 may determine the degree of priority by comparing the two classification conditions stored in the classification condition storage section 21 by the second process.

Then, in the exemplary embodiment, it is assumed that the priority degree determination section 22 of the terminal device 20 creates the evaluation document data; however, the evaluation document data may be created by actually reading a printed document by the image reading device 10. In this case, after printing the document matching the classification condition of the evaluation target is printed by the image reading device 10 and the like, the printed document is read and the evaluation document data is created.

Note that, in the exemplary embodiment, in the third examination step, the priority is given to the classification condition including the larger number of words in the designated characters per unit area; however, instead of the number of words, the number of characters may be used for determining the degree of priority.

Moreover, in the exemplary embodiment, the image reading device 10 may have the function of the terminal device 20. In other words, the image reading device 10 may include the functions of the priority degree determination section 22, the image information obtaining section 23, the classification execution section 24 and the like of the terminal device 20. In this case, for example, when a new classification condition is defined by a user, the image reading device 10 executes the first process or the second process, to thereby determine the degree of priority of the classification condition. To additionally describe, in this case, the image reading device 10 can be grasped as an example of an information processing device.

Further, it may be possible to assume that the terminal device 20 includes a part of functions of the priority degree determination section 22, the image information obtaining section 23 and the classification execution section 24, not all of them. For example, it may be possible that the terminal device 20 includes the function of the priority degree determination section 22, and the image reading device 10 includes the functions of the image information obtaining section 23 and the classification execution section 24.

Moreover, it is possible to provide a program that implements the exemplary embodiment according to the present invention by a communication tool, of course, and it is also possible to store thereof in a storage medium, such as a CD-ROM, to be provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a central processing unit (CPU) programmed to obtain a first classification condition for classifying a document by use of image information of an image formed on the document;
   a user interface device configured to accept a second classification condition for classifying the document, the second classification condition being newly defined by a user; and
   a display that displays a result of classifying the document,
   wherein the CPU is further programmed to:
   after accepting the second classification condition defined by the user, determine a degree of priority of the second classification condition by:
   (i) when preliminary settings for executing a first process have been made, executing the first process of assigning a priority to the second classification condition defined by the user that is higher or lower than a priority assigned to the first classification condition, the assigned priority being based on a rule of the degree of priority that predetermines which of the first classification condition or the second classification condition is prioritized; and
   (ii) when the preliminary settings for executing the first process have not been made, executing a second process of comparing the second classification condition with the first classification condition, and assigning priority to one of the first classification condition or the second classification condition having the highest degree of priority,
   wherein, in each of the classification conditions, characters corresponding to a classification category to which the document is to be classified and a region on the document where the characters should exist are designated, and based on an inclusion relation between characters designated in the first classification condition and characters designated in the second classification condition, the CPU is, in the second process, further programmed to give priority to one of the first classification condition and the second classification condition in which second characters are designated, the second characters including first characters designated in the other one of the first classification condition and the second classification condition; and
   apply at least any one of the first classification condition and the second classification condition to the image information based on the determined degree of priority, and classify the document.

2. The information processing device according to claim 1, wherein, as the rule of a degree of priority, the CPU is further programmed to give priority to any one of the first classification condition and the second classification condition based on contents defined in each of the classification conditions, to be applied to the image information.

3. The information processing device according to claim 2, wherein the CPU is further programmed to:
   create first image information satisfying the first classification condition and second image information satisfying the second classification condition, and
   based on a result of application of both of the first classification condition and the second classification condition to each of the first image information and the second image information created, give priority to any one of the classification conditions to be applied to the image information.

4. The information processing device according to claim 2, wherein, in each of the classification conditions, characters corresponding to a classification category to which the document is to be classified and a region on the document where the characters should exist are designated, and based on the number of words in the characters per unit area of each region in the characters and the region designated in each of the first classification condition and the second classification condition, the CPU is further programmed to give priority to any one of the classification conditions to be applied to the image information.

5. An image processing system comprising:
   a scanner that reads an image formed on a document;
   a central processing unit (CPU) programmed to obtain a first classification condition for classifying the document by use of image information obtained by the scanner;
   a user interface device configured to accept a second classification condition for classifying the document, the second classification condition being newly defined by a user; and
   a display that displays a result of classifying the document,
   wherein the CPU is further programmed to:
   after accepting the second classification condition defined by the user, determine a degree of priority of the second classification condition by:
   (i) when preliminary settings for executing a first process have been made, executing the first process of assigning a priority to the second classification condition defined by the user that is higher or lower than a priority assigned to the first classification condition, the assigned priority being based on a rule of the degree of priority that predetermines which of the first classification condition or the second classification condition is prioritized; and (ii) when the preliminary settings for executing the first process have not been made, executing a second process of comparing the second classification condition with the first classification condition, and assigning priority to one of the first classification condition or the second classification condition having the highest degree of priority, wherein, in each of the classification conditions, characters corresponding to a classification category to which the document is to be classified and a region on the document where the characters should exist are designated, and based on an inclusion relation between characters designated in the first classification condition and characters designated in the second classification condition, the CPU is, in the second process, further programmed to give priority to one of the first classification condition and the second classification condition in which second characters are designated, the second characters including first characters designated in the other one of the first classification condition and the second classification condition; and apply at least any one of the first classification condition and the second classification condition to the image information based the determined degree of priority and classify the document.

6. A non-transitory computer readable medium storing a program that causes a computer to execute functions, the functions comprising:

obtaining a first classification condition for classifying a document by use of image information of an image formed on the document;

accepting a second classification condition for classifying the document, the second classification condition being newly defined by a user;

after accepting the second classification condition defined by the user, determining a degree of priority of the second classification condition by:

(i) when preliminary settings for executing a first process have been made, executing the first process of assigning a priority to the second classification condition defined by the user that is higher or lower than a priority assigned to the first classification condition, the assigned priority being based on a rule of the degree of priority that predetermines which of the first classification condition or the second classification condition is prioritized; and (ii) when the preliminary settings for executing the first process have not been made, executing a second process of comparing the second classification condition with the first classification condition, and assigning priority to one of the first classification condition or the second classification condition having the highest degree of priority, wherein, in each of the classification conditions, characters corresponding to a classification category to which the document is to be classified and a region on the document where the characters should exist are designated, and based on an inclusion relation between characters designated in the first classification condition and characters designated in the second classification condition, the CPU is, in the second process, further programmed to give priority to one of the first classification condition and the second classification condition in which second characters are designated, the second characters including first characters designated in the other one of the first classification condition and the second classification condition; and applying at least any one of the first classification condition and the second classification condition to the image information based the determined degree of priority, and classifying the document; and causing a display to display a result of classifying the document.

* * * * *